United States Patent

[11] 3,576,418

[72] Inventors Oran J. Sands;
 Charles W. Smith, Columbus, Ind.
[21] Appl. No. 771,729
[22] Filed Oct. 30, 1968
[45] Patented Apr. 27, 1971
[73] Assignee Arvin Industries, Inc.
 Columbus, Ind.

[54] WELDING TOOL
 6 Claims, 3 Drawing Figs.
[52] U.S. Cl. ..................................................... 219/86
[51] Int. Cl. ....................................................... B23k 11/10
[50] Field of Search ........................................... 219/89,
 119, 120, 78, 88

[56] References Cited
 UNITED STATES PATENTS
| | | | |
|---|---|---|---|
| 2,045,523 | 6/1936 | Fassler | 219/86 |
| 2,494,847 | 1/1950 | Welch | 219/86 |
| 3,369,102 | 2/1968 | Jacobs | 219/119X |

Primary Examiner—J. V. Truhe
Assistant Examiner—J. G. Smith
Attorney—Trask, Jenkins and Hanley ABSTRACT: A welding tool in which there is provided a hollow cylindrical jacket made of electrically conductive material and adapted to be connected to an electrical power source. The jacket is closed at one of its ends and is provided with a web extending thereacross to define a chamber between said web and its closed end for the reception of a circulating coolant. A welding tip projecting outwardly from the jacket is mounted in electrically insulating guide means slidably carried in said jacket. Said tip is provided with a displaceable member formed of electrically insulating material interposed between it and the jacket web for normally supporting said tip in spaced relation to said web. When an axially directed force is applied to said tip, the member interposed between it and the web will be displaced to thus permit said tip to be moved into electrically conductive relationship with said web and power source.

Patented April 27, 1971

3,576,418

INVENTORS
ORAN J. SANDS
CHARLES W. SMITH

BY
*Trask, Jenkins & Harris*
ATTORNEYS

WELDING TOOL

BACKGROUND OF THE INVENTION

In welding large multiple component assemblies wherein a series of welds are successively made, it is common practice to employ a plurality of fixed welding tips on one side of the assembly and a movable tip on the opposite side of said assembly. The fixed tips are in fixed engagement with the assembly and the movable tip is successively moved into engagement with the assembly in positions of alignment with the various fixed tips to form a plurality of welds. All of the fixed tips, however, by being connected into the welding circuit, act as shunts to rob current from the circuit when the various welds are being made.

It is an object of this invention to provide a welding tool which will permit such fixed welding tips to be effectively disconnected from the welding circuit except when each is being used to form a particular weld.

SUMMARY OF THE INVENTION

In accordance with one form of the invention, there is provided a cylindrical jacket formed from an electrically conductive material and adapted to be connected to an electrical power source. A cap is threadably connected to the jacket for closing one of its ends and a web extends across said jacket adjacent the cap to define with said cap a chamber having an inlet and outlet for reception of a circulating coolant.

A guide formed from electrically insulating material is slidably carried in said jacket and a welding tip is mounted in said guide for sliding movement with respect to said jacket. One end of said tip projects outwardly from the open end of the jacket and a displaceable stud formed from electrically insulating material is mounted on the opposite end of said tip. The stud projects outwardly from the tip into engagement with the jacket web for normally supporting said tip in spaced relation to said web. However, with said stud being displaceable, when an axially directed force is applied to said tip, said stud will be displaced to permit the tip to engage the web and thus be electrically connected to said power source. When the pressure is removed from said tip, the stud will force the tip out of engagement with the web to thereby disconnect said tip from the power source.

DESCRIPTION OF THE DRAWINGS

The accompanying drawings illustrate the invention. In such drawings.

DETAILED DESCRIPTION OF THE PREFERRED EMBODIMENT

Figure 1:
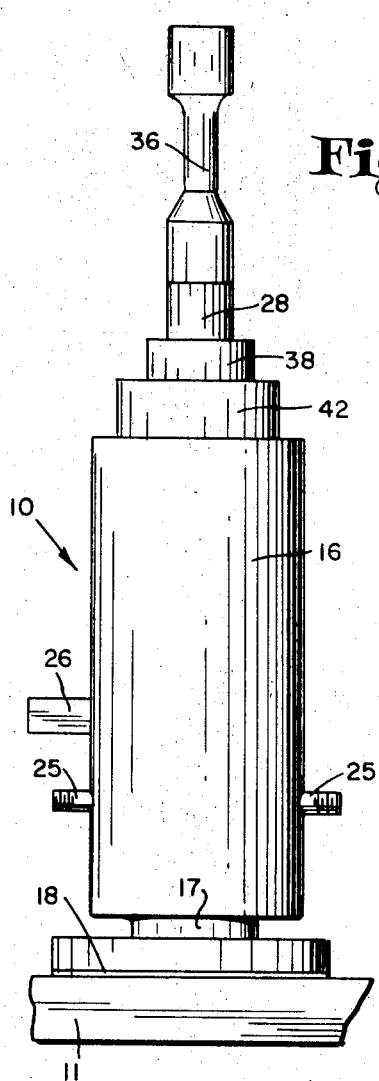
FIG. 1 is a side elevation of a welding tool embodying the invention.
Figure 3:
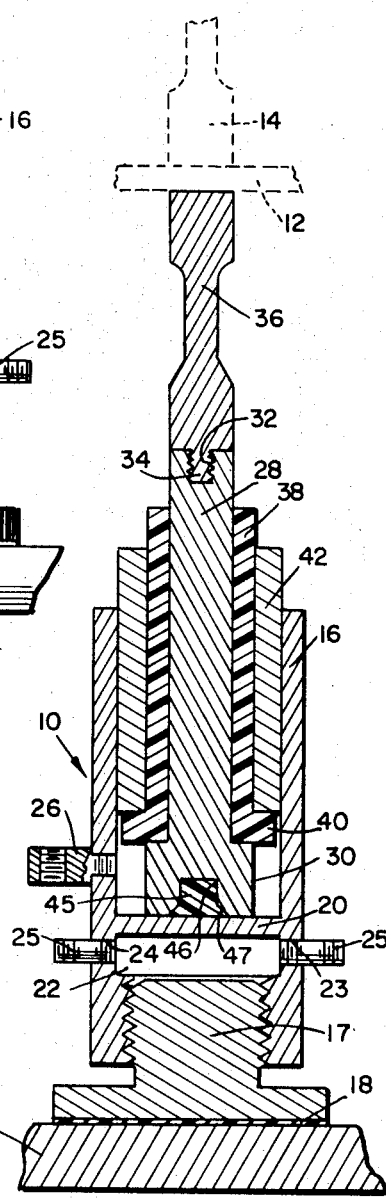
FIG. 3 is a longitudinal section similar to FIG. 2 but showing the welding tool in operative position.
Figure 2:
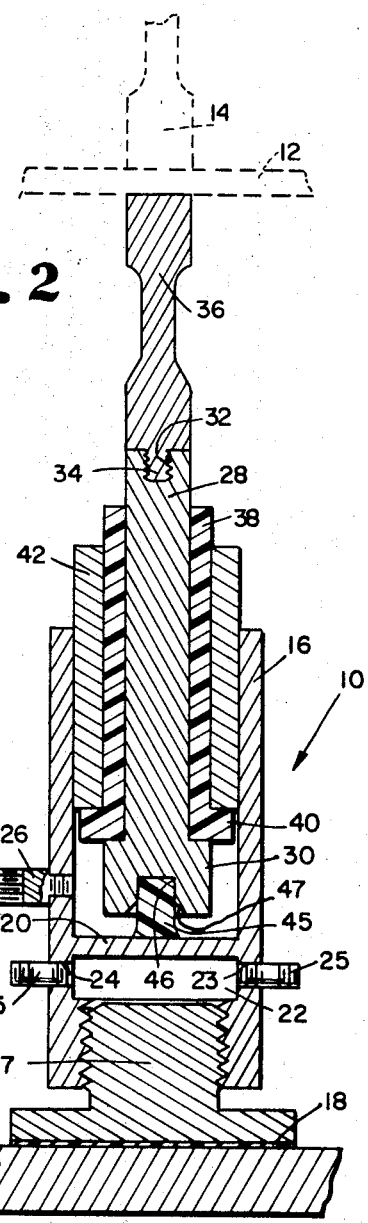
FIG. 2 is a longitudinal section through the welding tool shown in FIG. 1 and showing said tool in association with a cooperative tool and workpiece represented in dotted line form.

As shown in FIGS. 2 and 3, our welding tool 10 is adapted to be supported on a fixture 11 in engagement with one side of a workpiece 12 with a cooperative welding tool 14 being disposed upon the opposite side of said workpiece and adapted to force said workpiece against the tool 10.

The tool 10 comprises a hollow cylindrical jacket 16 threadably connected at one of its ends to a cap 17 mounted on the fixture 11 and electrically insulated therefrom by an insulating layer 18. The cap 17 is adapted to close one end of the jacket 16, and by being threadably connected thereto, said cap can further serve to adjust the vertical positioning of the tool with respect to the fixture 11. A web 20 extends across the jacket 16 adjacent the cap 17, and said web and cap act in combination to form a chamber 22 through which a liquid coolant can be circulated. To this end, said jacket is provided with openings 23 and 24 which serve as an inlet and an outlet for the chamber 22 and which are adapted to be connected to nipples 25 joined to a circulating coolant supply (not shown). The jacket 16 is formed from a electrically conductive material and is adapted to be connected, as by a terminal 26, to a source of electrical power (not shown). Thus, the entire jacket is electrically conductive, but said jacket is insulated from the fixture 11 by the insulating layer 18.

A welding tip is slidably carried in the jacket 16 and projects outwardly from the open end thereof. As shown, said tip comprises a body 28 having an expanded base 30 at its lower end. The upper end of the body 28 has a tapped opening 32 for the reception of a threaded stud 34 on a replaceable head 36 adapted to be disposed in engagement with the workpiece 12. In order to guide the sliding movements of the tip, it is mounted in a sleeve 38 of electrically insulating material whose lower end is supported on the tip base 30. Said sleeve is provided at its lower end with an annular outwardly projecting shoulder 40 slidably engaging the inner walls of the jacket and supporting the lower end of a second sleeve 42. The sleeve 42, which has a shorter axial length than the sleeve 38, is formed of electrically conductive material and is carried in sliding engagement with the inner walls of the jacket 16. In the embodiment shown, the sleeve 38 prevents arcing between the tip and the jacket. Alternatively, in order to prevent such arcing, the sleeve 42 could be removed and the sleeve 38 dimensioned such that it would be disposed in sliding engagement with the inner wall of the jacket 16.

As shown in FIG. 2, a stud 45 formed from a displaceable electrically insulating material capable of being compressed, such as polyurethane, is mounted in an opening 46 in the lower end of the tip base 30. The stud 45 projects outwardly from said base into engagement with the jacket web 20 which forms abutment for the tip for normally supporting said tip in the jacket out of engagement with said web. As shown in FIG. 3, when the tool 14 applies a force to the workpiece 12, said force is transmitted to the tip head 36 causing the welding tip to slide inwardly with respect to the jacket 16. Such force compresses the stud 45 into the beveled end 47 of the opening 46 to thus permit the welding tip base 30 to engage the web 20 for thus connecting the welding tip to the power source. When the pressure from the welding tool 14 is removed, the stud 45, due to its inherent resiliency, will reexpand to move the welding tip base 30 into the position shown in FIG. 2 in which it is out of engagement with the web 20 and thus disconnected from the power source.

We claim:

1. A welding tool, comprising a hollow jacket, having an electrically conductive abutment therein, means for connecting said abutment to an electrical power source, a welding tip slidably carried in said jacket and projecting outwardly therefrom, the inner end of said tip having an opening formed therein, guide means interposed between said tip and jacket for guiding the movements of said tip with respect to said jacket, member formed of electrically insulating material carried in said tip opening and interposed between said tip and abutment to normally support said tip in spaced relation to said abutment, said member being formed from a displaceable material whereby a force against said tip will cause said member to be displaced into said tip opening to permit said tip to be disposed in conductive contact with said abutment, and electrically insulating means interposed between said guide means and tip.

2. The invention as set forth in claim 1 in which said jacket is formed from electrically conductive material, said abutment is a web extending across said jacket, and said guide means electrically insulate said tip from said jacket.

3. The invention as set forth in claim 1 in which said tip comprises a body portion having an expanded base at its inner end with said member mounted thereon and having a replaceable head mounted on its outer end, and said insulating member has an annular shoulder at its inner end interposed between said guide means and said expanded base.

4. The invention as set forth in claim 1 in which said insulating means comprises a sleeve of electrically insulating material disposed around said tip, and said guide means comprises a sleeve of electrically conductive material interposed between said sleeve of insulating material and said jacket and slidably engageable with said jacket, said sleeve of insulating material having an axial extent greater than said sleeve of conductive material and provided with an annular shoulder at one of its ends slidably engageable with said jacket.

5. A welding tool, comprising a cylindrical jacket formed from electrically conductive material and having a web extending thereacross, means for connecting said jacket to an electrical power source, a welding tip slidably carried in said jacket and projecting outwardly from one end thereof, the inner end of said tip having an opening formed therein, closure means spaced from said web for closing the opposite end of said jacket, means between said web and closure means for connection to a source of circulating coolant whereby said coolant can circulate through said jacket between said web and closure means, electrically insulating guide means interposed between said tip and jacket for guiding the movements of said tip, and a member formed of electrically insulating material carried in said tip opening and interposed between said tip and abutment to normally support said tip in spaced relation to said web, said member being formed from a displaceable material whereby a force against said tip will cause said member to be displaced into the tip opening to permit said tip to be disposed in conductive contact with said web.

6. The invention as set forth in claim 5 in which said closure means comprises a cap threadably connected to said jacket and adapted to be mounted on a supporting member.